United States Patent [19]
Arai

[11] Patent Number: 5,788,005
[45] Date of Patent: Aug. 4, 1998

[54] FRONT WHEEL- AND REAR WHEEL-DRIVE VEHICLE

[75] Inventor: Kentarou Arai, Saitama-ken, Japan

[73] Assignee: Honda Giken Kogyo Kabushiki Kaisha, Tokyo, Japan

[21] Appl. No.: 633,419

[22] Filed: Apr. 17, 1996

[30] Foreign Application Priority Data

May 1, 1995 [JP] Japan .................... 7-107512

[51] Int. Cl.$^6$ .................................................. B60K 1/00
[52] U.S. Cl. ................... 180/65.2; 180/65.6; 180/247
[58] Field of Search ........................ 180/65.2, 197, 180/247, 233, 65.6, 65.4

[56] References Cited

U.S. PATENT DOCUMENTS

| | | | |
|---|---|---|---|
| 4,923,025 | 5/1990 | Ellers | 180/65.2 |
| 5,018,595 | 5/1991 | Hara et al. | 180/197 |
| 5,180,027 | 1/1993 | Hagiya | 180/197 |
| 5,249,641 | 10/1993 | Sakata | 180/197 |
| 5,263,548 | 11/1993 | Tsuyama | 180/197 |
| 5,575,350 | 11/1996 | Kiryu et al. | 180/197 |

FOREIGN PATENT DOCUMENTS

| | | |
|---|---|---|
| 1136 215 | 9/1962 | Germany . |
| 1 438 819 | 1/1969 | Germany . |
| 27 54 126 | 6/1979 | Germany . |
| 33 12 062 | 2/1986 | Germany . |
| 35 42 059 | 6/1987 | Germany . |
| 39 40 172 | 6/1991 | Germany . |
| 43 12 949 | 10/1994 | Germany . |
| 43 33 281 | 3/1995 | Germany . |
| 44 02 152 | 4/1995 | Germany . |
| 295 05 911 | 5/1995 | Germany . |
| 3-159502 | 7/1991 | Japan . |
| 5-8639 | 1/1993 | Japan . |

*Primary Examiner*—Brian L. Johnson
*Assistant Examiner*—Jonathan E. Butts
*Attorney, Agent, or Firm*—Armstrong, Westerman, Hattori, McLeland & Naughton

[57] ABSTRACT

Either the front wheels or the rear wheels of a front wheel- and rear wheel-drive vehicle are driven by an engine and the other thereof are driven by an electric motor. A μ detecting circuit detects a coefficient of friction on a road surface. A control circuit controls to operate the electric motor such that, when the vehicle is started in a condition in which a detected coefficient of friction is below a predetermined value, an output torque of the electric motor becomes a predetermined set value corresponding to the detected coefficient of friction.

2 Claims, 3 Drawing Sheets

FRONT WHEEL- AND REAR WHEEL-DRIVE VEHICLE

BACKGROUND OF THE INVENTION

1. Field of the Invention

The present invention relates to a front wheel- and rear wheel-drive vehicle in which either the front wheels or the rear wheels are driven by an engine and the other thereof are driven by an electric motor.

2. Description of the Related Art

Conventionally, there is known this kind of vehicle in which an alternating-current (AC) motor is used as an electric motor and in which the electric motor is made operable over an entire range of vehicle speed through an inverter control (see Japanese Published Unexamined Patent Application No. 159502/1991).

In order to cover the entire range of the vehicle speed as in the above-described prior art, it is necessary to employ an electric motor of large output. In addition, an inverter circuit becomes necessary, resulting in a higher cost.

By the way, if an arrangement is made to operate the electric motor only at the time of stating the vehicle in order to limit the purpose of using the electric motor to the assistance of the vehicle's starting on such a road of low coefficient of friction as on a snowy road or the like, it is possible to use such an inexpensive direct-current (DC) brush motor as is used as a self-starting motor or the like. However, depending on the coefficient of friction on the road surface, even if the electric motor is operated at the time of starting the vehicle, the wheels to be driven by the electric motor may slip. As a consequence, there is a possibility that the effect of assisting the vehicle's starting cannot be obtained.

SUMMARY OF THE INVENTION

In view of the above-described point, the present invention has an object of providing a front wheel- and rear wheel-drive vehicle in which the assistance at the time of starting the vehicle can be surely performed.

In order to attain the above object, the present invention is a front wheel- and rear wheel-drive vehicle in which either the front wheels or the rear wheels are driven by an engine and the other thereof are driven by an electric motor, said vehicle comprising: means for detecting a coefficient of friction on a road surface; and control means for controlling to operate the electric motor such that, when the vehicle is started in a condition in which a detected coefficient of friction is below a predetermined value, an output torque of the electric motor becomes a predetermined set value corresponding to the detected coefficient of friction.

Since the output torque of the electric motor is varied depending on the coefficient of friction on the road surface, the slipping of the wheels to be driven by the electric motor can be prevented to the maximum extent possible. The assurance or surety of assistance in starting the vehicle can therefore be improved.

In this case, if the set value of the output torque is set to such an upper limit value of the output torque of the electric motor as will not cause the wheels to be driven by the electric motor to slip on the road surface having the detected coefficient of friction, the wheels can be driven with a maximum driving force within a range not to cause slipping thereof. Therefore, the starting assistance can be made efficiently.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
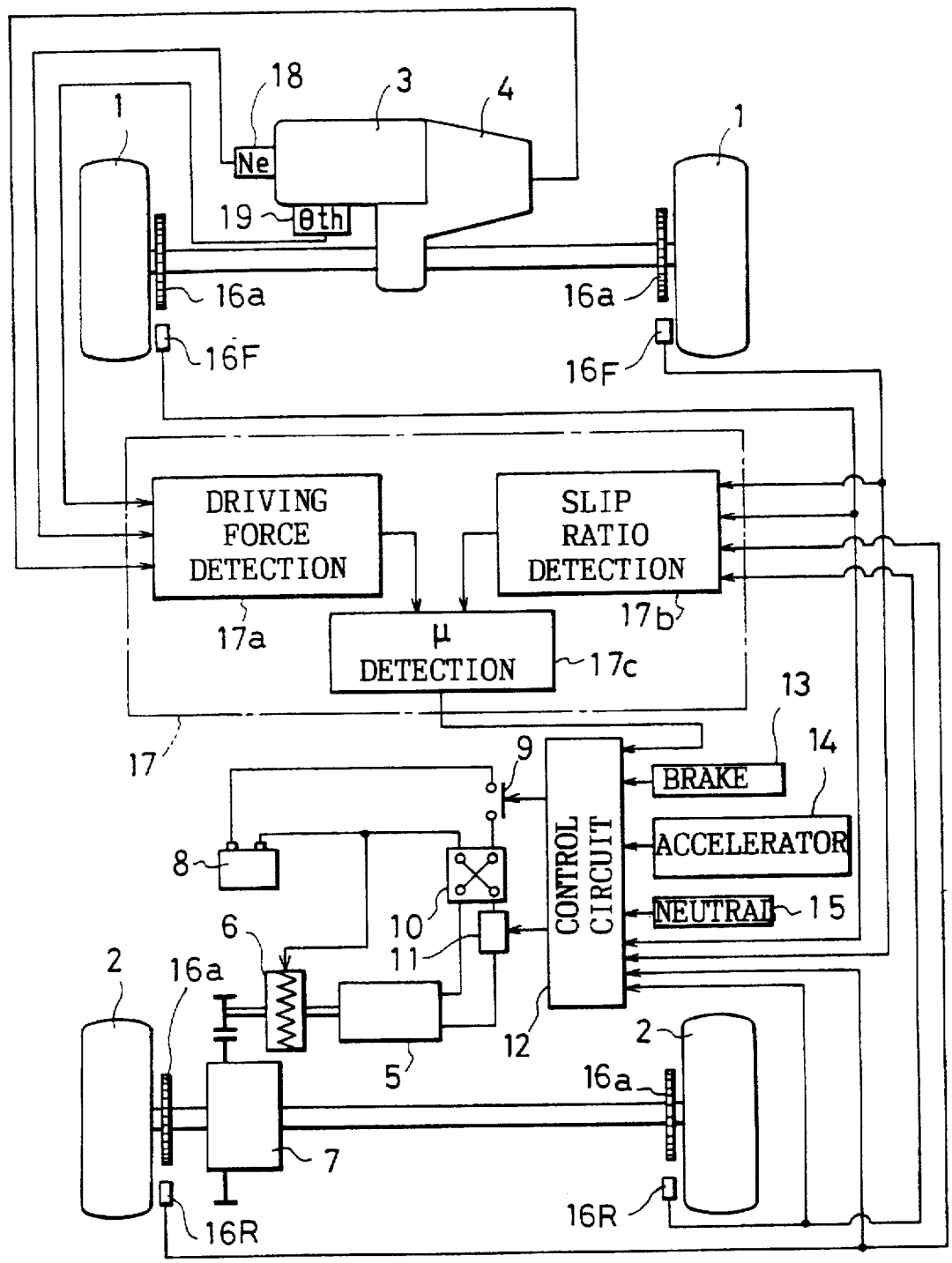
FIG. 1 is a skeleton diagram showing an embodiment of the present invention.

The embodiment in FIG. 1 shows a four-wheeled vehicle having a pair of front wheels 1 and a pair of rear wheels 2, respectively. The pair of right and left front wheels 1, 1 are driven by an engine 3 via a transmission 4. The pair of right and left rear wheels 2, 2 are driven by an electric motor 5 via a clutch 6 and a differential gear 7.

The electric motor 5 is constituted as a direct-current (DC) brush motor and is connected to a vehicle-mounted battery 8 via a main switch 9, a circuit 10 for switching between forward running and reverse running, and a motor driver 11 of a PWM (pulse with modulated inverter) type or a variable resistor type or the like. The main switch 9 and the motor driver 11 are controlled by a signal from the control circuit 12. When the main switch 9 is switched on, the electric motor 5 is operated and also the clutch 6 is engaged so that the rear wheels 2 can be driven by the electric motor 5. The driving force of the rear wheels 2 is thus made to be variable through the control of the output torque of the electric motor 5 by the motor driver 11. The circuit 10 for switching between forward running and reverse running is controlled to be switched in interlocking relationship with a shifting lever inside a compartment of the vehicle.

The control circuit 12 is made up of a microcomputer which receives the following input signals: i.e., a signal of a brake switch 13 for detecting whether a brake is off; a signal of an accelerator pedal switch 14 for detecting whether an accelerator pedal is on (i.e., depressed); a signal of a transmission sensor 15 for detecting whether the transmission 4 is in a neutral condition or not, e.g., a shift lever position sensor in an automatic transmission and a clutch switch in a manual transmission; and signals of wheel speed sensors 16R for detecting the revolution speeds of the rear wheels 2 in cooperation with pulser gears 16a which are mounted on the rear wheels 2. Further, there is provided a μ detecting circuit 17 for detecting, during running of the vehicle, a coefficient of friction μ on the road surface so that a signal from the μ detecting circuit 17 can also be inputted into the control circuit 12.

The μ detecting circuit 17 is made up of a driving force detecting section 17a for detecting the driving force of the front wheels 1, a slip ratio detecting section 17b for detecting the slip ratio of the front wheels 1, and a μ detecting section 17c for detecting the coefficient of friction μ on the road surface based on a correlation between the driving force and the slip ratio of the front wheels 1.

The driving force detecting section 17a receives the following input signals: i.e., a signal of a sensor 18 for detecting the revolution speed Ne of the engine 3; a signal of a sensor 19 for detecting a throttle opening degree θth of the engine 3; and a signal indicating the present established speed stage of the transmission 4. An engine output torque is derived or obtained from Ne and θth through map searching or the like. From this output torque and a gear ratio of the established speed stage, the driving force of the front wheels 1 is computed. By the way, there is a vehicle having mounted thereon a system in which, based on the intention of a driver to be determined from an amount of depression of the accelerator pedal and the present driving conditions, the throttle opening degree, the fuel injection amount and the speed stage are electronically controlled. In this vehicle, a target value of the driving force of the wheels to be driven by the engine is computed by a control unit for the system. The engine and the transmission are thus controlled so that the driving force becomes the target value. Therefore, this control unit may be used to serve the dual purpose of the driving force detecting section.

The slip ratio detecting section 17b receives the following input signals: i.e., signals of wheel speed sensors 16F which detect the revolution speeds of the front wheels 1 in cooperation with pulser gears 16a mounted on the front wheels 1; and signals of the wheel speed sensors 16R which detect the revolution speeds of the rear wheels 2. Here, during running of the vehicle, the rear wheels 2 are rotated as driven wheels at a speed equivalent to the vehicle speed. Therefore, the slip ratio of the front wheels 1 as the driving wheels can be computed from the difference in revolution speeds between the front wheels 1 and the rear wheels 2. This computation is performed in the slip ratio detecting section 17b to thereby detect the slip ratio.

Figure 3:
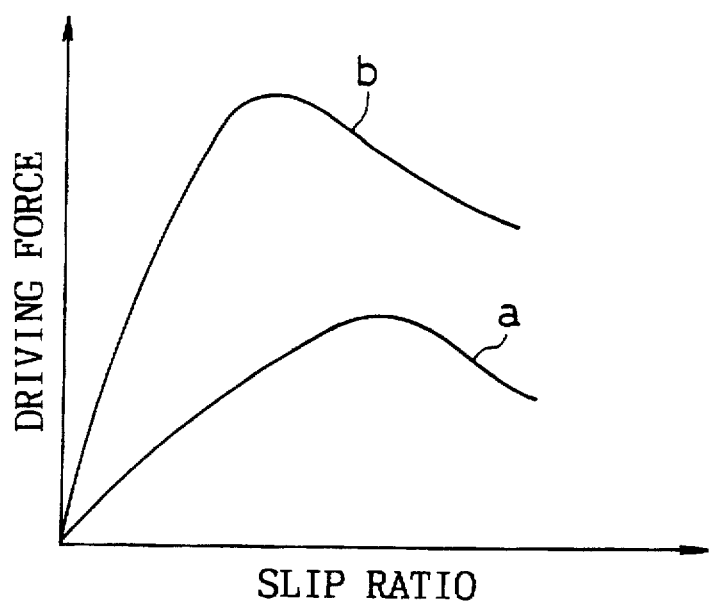
FIG. 3 is a graph showing the correlation between a driving force and a slip ratio.

The μ detecting section 17c receives inputs of a signal from the driving force detecting section 17a and a signal from the slip ratio detecting section 17b. Here, the correlation between the driving force and the slip ratio of the front wheels 1 will be as shown in a curve "a" in FIG. 3 in case the coefficient of friction μ on the road surface is low, and will be as shown in a curve "b" in case the coefficient of friction μ on the road surface is high. Then, in the μ detecting section 17c the coefficient of friction μ on the road surface is detected through map searching or the like based on the correlation between the driving force and the slip ratio. The detected value of coefficient of friction μ is transmitted to the control circuit 12.

Figure 2:
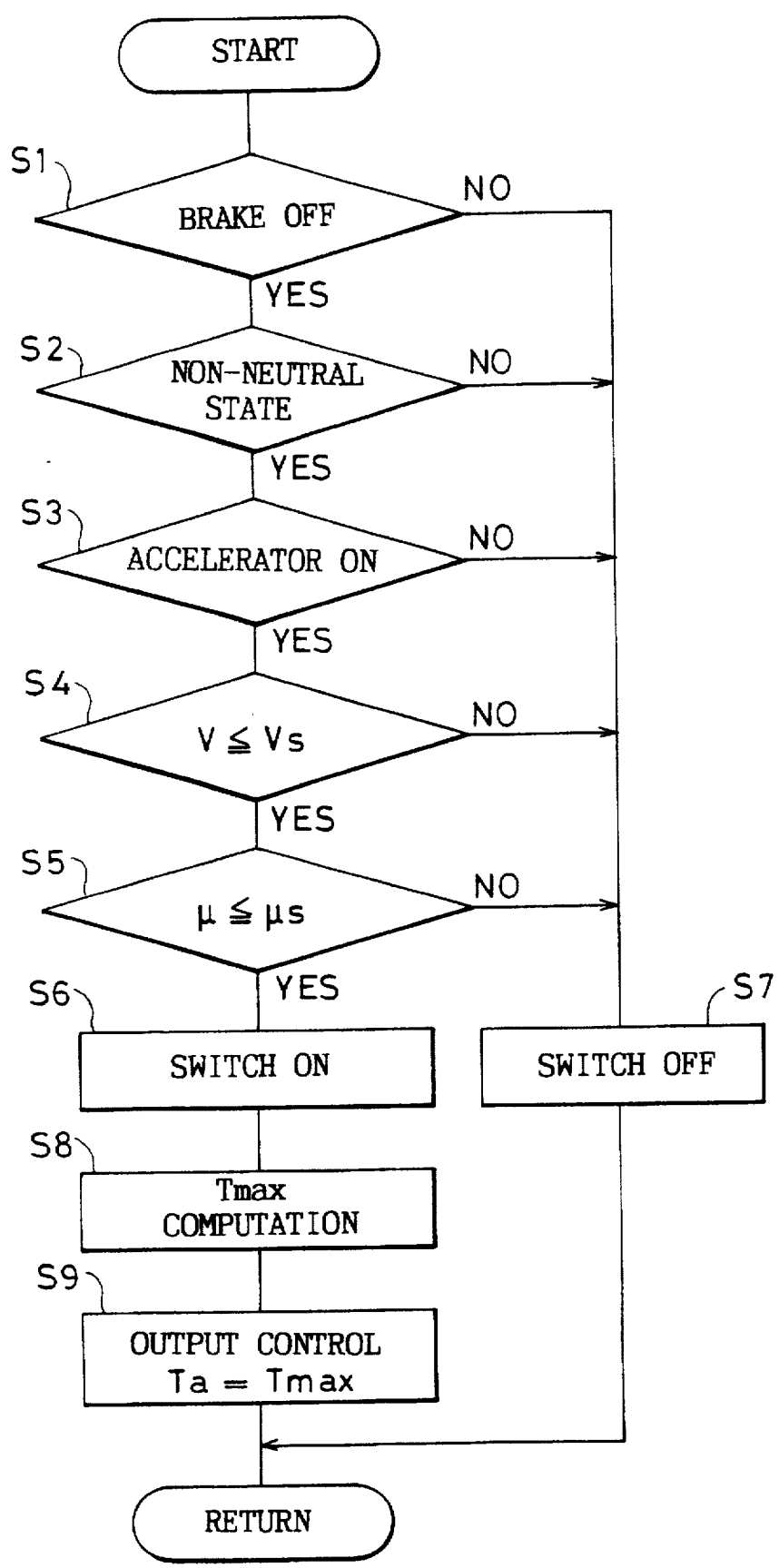
FIG. 2 is a flow diagram showing a control program of an electric motor.

The control process in the control circuit 12 is shown in FIG. 2. When the following four conditions are met, the vehicle is considered to be in a state of being started, the four conditions being that the brake (inclusive of a parking brake and a side brake) is off or released (S1), that the transmission is in a non-neutral condition (S2), that the accelerator pedal is on (i.e., depressed) (S3), and that the revolution speed of the rear wheels (vehicle speed) V is equal to or smaller than a predetermined value Vs (S4). When the vehicle is considered to be in a state of being started, a determination is made as to whether the value of coefficient of friction μ detected before stopping of the vehicle is equal to or smaller than a predetermined value μs (S5). When μ≦μs, the main switch 9 is switched on (S6). When the vehicle is not in a state of being started because any one of the above four conditions is not met or, if μ>μs even if the vehicle is in a state of being started, the main switch 9 is switched off (S7). In this manner, when the vehicle is started on a road of low coefficient of friction μ, the electric motor 5 is operated from the beginning of the starting of the vehicle to thereby drive the rear wheels 2. As a result, the starting of the vehicle is assisted with a good response. It also becomes only on the occasion of starting the vehicle on a road of low coefficient of friction μ that the electric motor 5 is operated. It follows that there will be no problem in durability even if an inexpensive DC brush motor is used as the electric motor 5. In the present embodiment, the following arrangement is further made. Namely, when μ≦μs, such an upper limit value Tmax of the output torque Ta of the electric motor 5 as will not cause slipping of the rear wheels 2 at this value of coefficient of friction μ is computed by map searching or the like (S8). The motor driver 11 is controlled such that the output torque Ta becomes the maximum value Tmax (S9). Thus, the rear wheels 2 are driven by the maximum driving force while preventing the slipping thereof, thereby effectively and surely attaining a starting assistance of the vehicle. This output control is performed in a feedback or feedforward method by detecting the current value of the electric motor 5 such that the electric current value becomes one corresponding to the maximum value Tmax.

By the way, at the time of applying the brake, the coefficient of friction μ on the road surface cannot accurately be detected. As a solution, a determination processing is made in step S5 based on the value of coefficient of friction μ which was detected in step S5 just before applying the brake. In addition, in the present embodiment, the control circuit 12 receives input signals from the revolution speed sensors 16F for the front wheels, aside from the signals from the revolution speed sensors 16R for the rear wheels. A determination is thereby made as to whether the vehicle started well without giving rise to slipping of the front wheels 1. The values of the above-described Vs and μs are accordingly made to be changeable through a learning control.

An explanation has so far been made about an embodiment in which the present invention is applied to a front wheel- and rear wheel-drive vehicle whose front wheels 1 are driven by the engine 3 and the rear wheels 2 are driven by the electric motor 5. The present invention may of course be similarly applied to a vehicle in which the rear wheels are driven by the engine and the front wheels are driven by the electric motor.

As can be seen from the above explanations, according to the present invention, the assurance or surety of assistance by the electric motor in starting the vehicle on the road of low coefficient of friction μ can be improved.

It is readily apparent that the above-described front wheel- and rear wheel-drive vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A front wheel- and rear wheel-drive vehicle in which either the front wheels or the rear wheels are driven by an engine and the other thereof are driven by an electric motor, said vehicle comprising:

means for detecting a coefficient of friction on a road surface; and control means, operably coupled to said means for detecting said coefficient of friction, for controlling operation of said electric motor such that, when the vehicle is started in a condition in which a detected coefficient of friction is below a predetermined value, an output torque of said electric motor becomes a predetermined set value corresponding to the detected coefficient of friction.

2. A front wheel- and rear wheel-drive vehicle according to claim 1, wherein said set value is set to such an upper limit value of the output torque of said electric motor as will not cause the wheels to be driven by said electric motor to slip on the road surface having the detected coefficient of friction.

* * * * *